Sept. 17, 1968 W. M. ADAMS 3,401,981
VEHICLE WHEEL ADJUSTMENT MEANS
Filed Feb. 20, 1967
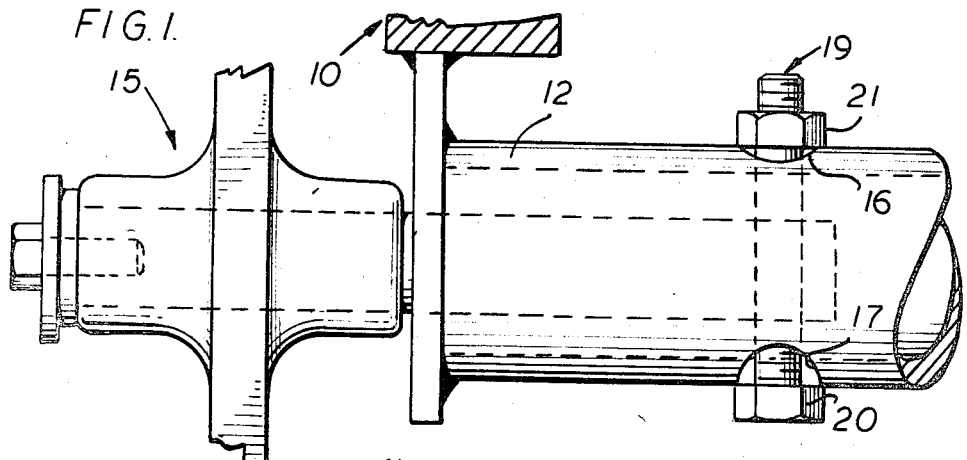
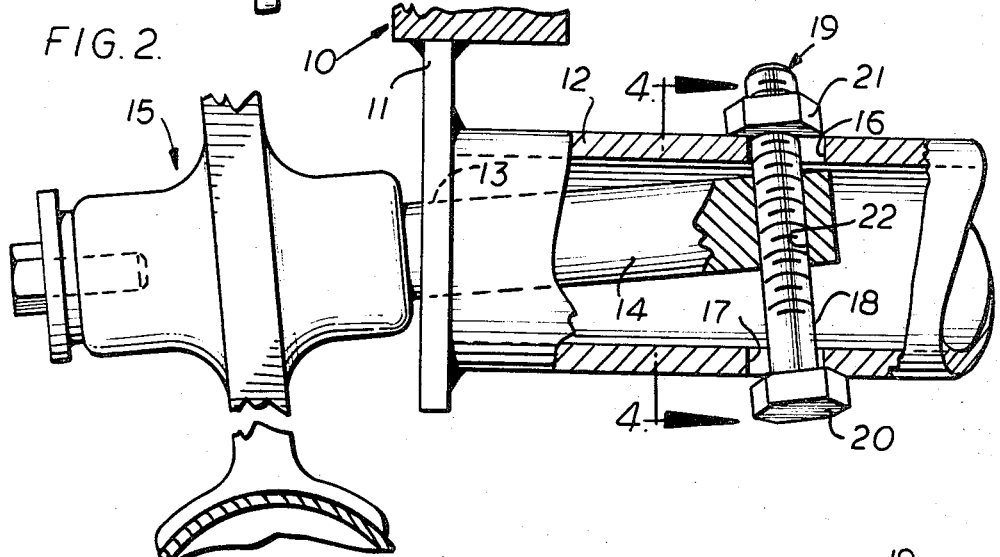
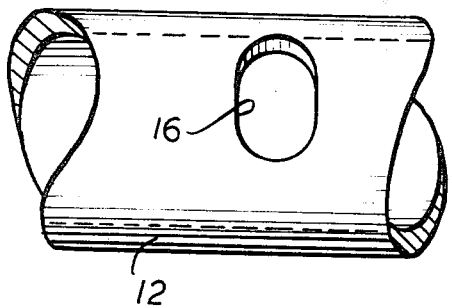
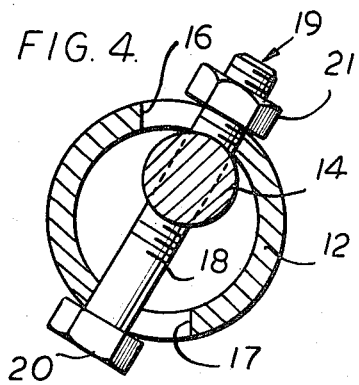
INVENTOR
WILLIAM M. ADAMS
ATTY

United States Patent Office 3,401,981
Patented Sept. 17, 1968

3,401,981
VEHICLE WHEEL ADJUSTMENT MEANS
William M. Adams, Stockton, Calif., assignor to International Harvester Company, Chicago, Ill., a corporation of Delaware
Filed Feb. 20, 1967, Ser. No. 617,410
4 Claims. (Cl. 301—132)

ABSTRACT OF THE DISCLOSURE

On a vehicle such as a trailer where the wheel axle is rigid, each wheel is carried on a shaft pivotally mounted in an opening in a hollow axle permitting the inner end of the shaft to be vertically and horizontally adjusted. The shaft has a threaded opening aligned with openings in the hollow axle circumferentially displaced from the vertical, and a bolt extending through the openings in the axle and threaded in the shaft opening can be adjusted to vertically and horizontally adjust the inner end of the axle to simultaneously vary the camber and toe-in of the wheel.

---

This invention relates to vehicles and particularly to trailers, wagons and the like having rigidly mounted axles and wheels, and an object of the invention is the provision of novel means for adjusting the camber and toe-in of the wheels of trailers and the like.

Another object of the invention is the provision, in a relatively rigidly mounted vehicle wheel, of novel means for simultaneously adjusting the camber and toe-in of the wheel.

Other objects and advantages of the invention will become clear from the following detailed description when read in conjunction with the accompanying drawings wherein:

FIGURE 1 is a sectional detail showing the manner in which a wheel and axle assembly incorporating the features of this invention is mounted on a vehicle frame;

FIGURE 2 is a view similar to FIGURE 1, with parts broken away, showing the means by which the angular disposition of the wheel is adjusted;

FIGURE 3 is a detail of a portion of the axle assembly; and

FIGURE 4 is a section taken on the line 4—4 of FIGURE 2.

In the drawings the numeral 10 designates a part of the vehicle frame at one side thereof having depending side bracket plates 11, only one of which is shown, to which the ends of a transverse tubular axle member 12 are affixed, as by welding. An opening 13 in plate 11 is coaxial with axle member 12 and is of sufficient size to pivotally receive a wheel shaft 14 upon the outer end of which is mounted a wheel 15.

A pair of aligned openings 16 and 17 in axle member 12 are angularly displaced from the vertical, as indicated in FIGURE 4, and receive the threaded shank 18 of a bolt 19 having a head 20 and a nut 21 engageable with the outer surface of the axle.

Near its inner end, shaft 14 has a radial bore 22 threaded to adjustably receive the threaded shank 18 of the bolt, and openings 16 and 17, which are circumferentially elongated, are wider and longer than the diameter of shank 18 but axially narrower in width than head 20 and nut 21.

By revolving shaft 14 counterclockwise from the position shown in FIGURE 4, a vertical disposition of bolt 19 will eliminate toe-in and cause the wheel 15 to be run parallel to the body of the vehicle. The camber of the wheels can then be adjusted by rotating bolt 19 to angularly adjust the inner end of shaft 14 and therefore wheel 15. The size of openings 16 and 17 accommodates the angular disposition of bolt 19, and with the position of the bolt as indicated in FIGURE 4, rotation of the bolt in opening 22 in the shaft moves the inner end of shaft 14 both vertically and horizontally, simultaneously adjusting both camber and toe-in. The wheels 15 are retained in their adjusted positions by tightening nut 21 against axle member 12.

It is believed that the construction and operation of the adjustable camber and toe-in means of this invention will be clearly understood from the foregoing description.

What is claimed is:

1. Adjustable mounting means for the supporting wheels of a vehicle having a frame comprising, a rigid tubular axle mounted horizontally on the frame, closure means for one end of said tubular axle and having an opening therein, a wheel shaft of smaller diameter than the internal diameter of said tubular axle pivotally received in said opening having a supporting wheel rotatably mounted on the outer end thereof and having its inner end extending into said axle, said tubular axle having aligned radial openings therethrough, and adjusting means extending exteriorly of said tubular axle through said openings and operatively connected to the inner end of said shaft for pivoting the shaft in the opening in said bracket plate, the opening in said tubular axle being disposed in a vertical plane parallel to the direction of travel of the vehicle on an axis angularly displaced between the vertical and horizontal, whereby said shaft is simultaneously tilted both vertically and in the direction of travel of the vehicle.

2. The invention set forth in claim 1, wherein said adjusting means includes a bolt having a head and a threaded shank of lesser diameter than the openings in said tubular axle and the inner portion of said shaft having a threaded opening to receive said threaded shank to pivot the latter in the opening in said closure means in response to adjustment of said bolt.

3. The invention set forth in claim 1, wherein means are provided for locking said bolt in a selected adjusted position of said shaft.

4. Adjustable mounting means for the supporting wheel of a vehicle having a rigid tubular axle comprising a bracket plate closing one end of said axle having an opening therein, a wheel shaft of smaller diameter than the internal diameter of said tubular axle pivotally received in said opening having a supporting wheel rotatably mounted on the outer end thereof and having a threaded radial opening through its inner end, said tubular axle having radial openings therethrough in alignment with the threaded opening in said shaft, the axis of the openings in said tubular axle being circumferentially displaced between the vertical and horizontal, a bolt having a head and a shank of lesser diameter than and extending through the openings in said tubular axle to accommodate the pivoting of said shaft and threaded for reception in the opening in said shaft, said bolt being adjustable in the opening in said shaft to vary the angular relationship of the shaft to the tubular axle, and means for securing said bolt and said shaft in a selected adjusted position.

References Cited

UNITED STATES PATENTS

| 181,647 | 8/1876 | DeValin | 301—132 X |
| 231,545 | 9/1880 | Davis | 301—132 X |
| 1,396,128 | 11/1921 | Kopplin | 301—132 |

RICHARD J. JOHNSON, *Primary Examiner.*